United States Patent
Nath et al.

(10) Patent No.: US 9,412,277 B2
(45) Date of Patent: Aug. 9, 2016

(54) VEHICLE CUT-IN STRATEGY

(71) Applicant: Ford Global Technologies, LLC, Dearborn, MI (US)

(72) Inventors: Nitendra Nath, Troy, MI (US); Aaron L. Mills, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/512,571

(22) Filed: Oct. 13, 2014

(65) Prior Publication Data

US 2016/0104381 A1 Apr. 14, 2016

(51) Int. Cl.
*G08G 1/16* (2006.01)

(52) U.S. Cl.
CPC ..................... *G08G 1/167* (2013.01)

(58) Field of Classification Search
CPC .................................................. G08G 1/167
See application file for complete search history.

(56) References Cited

U.S. PATENT DOCUMENTS

| | | | |
|---|---|---|---|
| 5,530,771 A | 6/1996 | Maekawa | |
| 6,636,148 B2 | 10/2003 | Higuchi | |
| 6,708,099 B2 * | 3/2004 | Tellis | B60K 31/0008 180/167 |
| 7,444,241 B2 | 10/2008 | Grimm | |
| 7,720,580 B2 | 5/2010 | Higgins-Luthman | |
| 7,753,153 B2 | 7/2010 | Swoboda et al. | |
| 8,027,029 B2 | 9/2011 | Lu et al. | |
| 8,355,539 B2 | 1/2013 | Tan et al. | |
| 2002/0027503 A1 * | 3/2002 | Higuchi | G05D 1/0246 340/436 |
| 2003/0069695 A1 * | 4/2003 | Imanishi | B60R 1/00 701/301 |
| 2005/0171675 A1 | 8/2005 | Sawamoto et al. | |
| 2007/0150196 A1 * | 6/2007 | Grimm | B60T 7/22 701/301 |
| 2013/0144502 A1 * | 6/2013 | Shida | B60K 31/0008 701/96 |
| 2013/0226433 A1 | 8/2013 | Tominaga et al. | |
| 2013/0253796 A1 * | 9/2013 | Luo | G08G 1/166 701/96 |

FOREIGN PATENT DOCUMENTS

| | | |
|---|---|---|
| JP | H0789367 A | 4/1995 |
| JP | H09223235 A | 8/1997 |
| JP | H11321379 A | 11/1999 |
| JP | 2002334330 A | 11/2002 |
| JP | 2004249761 A | 9/2004 |
| JP | 2008117073 A | 5/2008 |

OTHER PUBLICATIONS

IEEE Xplore Digital Library—Abstract (2 pages), "Cut-in vehicle recognition system", Intelligent Transportation Systems, 1999, Proceedings, 1999 IEEE/IEEJ/JSAI International Conference, Tokyo, Japan, Oct. 5-8, 1999; ISBN: 0-7803-4975-X.
Hwang et al., "Vision-based vehicle detection and tracking algorithm design", SPIE Digital Library, Optical Engineering, vol. 48, Issue 12, Machine Vision, Pattern Recognition, Dec. 11, 2009 (3 pages).
GB Search Report dated Mar. 11, 2016 (5 pages).

* cited by examiner

*Primary Examiner* — Rodney Butler
(74) *Attorney, Agent, or Firm* — Frank A. MacKenzie; Bejin Bieneman PLC

(57) ABSTRACT

A vehicle system includes a first sensor configured to output a first signal and a second sensor configured to output a second signal. The first and second signals represent movement of a potential cut-in vehicle. The vehicle system further includes a processing device programmed to compare the movement of the potential cut-in vehicle to at least one threshold. The processing device selects the potential cut-in vehicle as an in-path vehicle if the movement exceeds the at least one threshold.

17 Claims, 6 Drawing Sheets

VEHICLE CUT-IN STRATEGY

BACKGROUND

Autonomous vehicles are subject to the same situations as human-driven vehicles. For example, autonomous vehicles will encounter potholes, closed lanes, stalled vehicles, and debris in the roadway. Some obstacles are easier to navigate around than others. For example, navigating around a stationary object is easier for a human driver as well as an autonomous vehicle. Avoiding moving objects, including other vehicles, can be more difficult.

BRIEF DESCRIPTION OF THE DRAWINGS

FIG. 4 is a flowchart of an example process for detecting a potential vehicle cut-in.

DETAILED DESCRIPTION

Autonomous vehicles can employ a cut-in strategy to deal with cut-in situations. A "cut-in" occurs when another vehicle, referred to as the "cut-in vehicle", attempts to enter the path of the autonomous vehicle. Sometimes, cut-in situations can be ignored. Other times, the cut-in vehicle should be considered an "in-path" vehicle, that is, a vehicle in the lane of the autonomous vehicle. The cut-in strategy implemented by the autonomous vehicle dictates when a potential cut-in vehicle should be ignored and when it should be considered an in-path vehicle.

An example autonomous vehicle employing such a cut-in strategy includes a first sensor configured to output a first signal and a second sensor configured to output a second signal. The first and second signals represent movement of a potential cut-in vehicle. For instance, the first signal may include a radar signal and the second signal may include a video signal. The vehicle system further includes a processing device programmed to compare the movement of the potential cut-in vehicle to at least one threshold. The processing device selects the potential cut-in vehicle as an in-path vehicle if the movement exceeds the at least one threshold. Otherwise, the potential cut-in vehicle is ignored.

The elements shown in the figures may take many different forms and include multiple and/or alternate components and facilities. The example components illustrated are not intended to be limiting. Indeed, additional or alternative components and/or implementations may be used.

Figure 1:
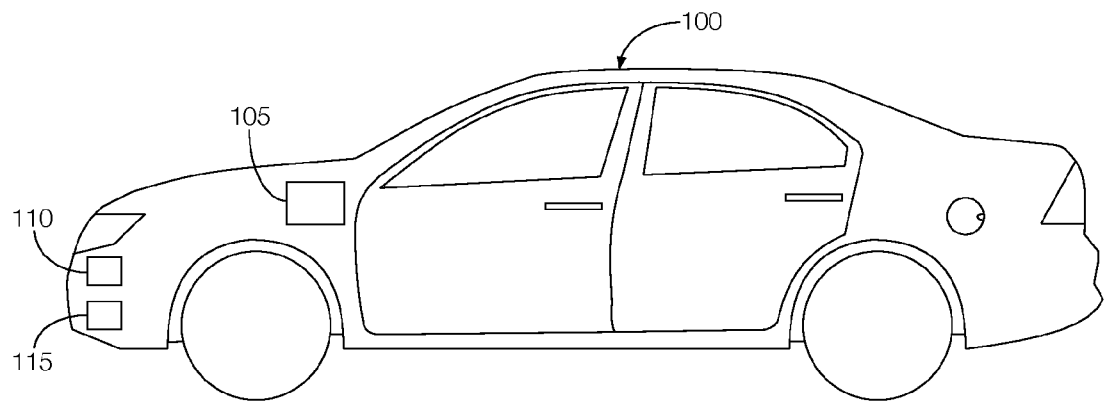
FIG. 1 illustrates an example autonomous vehicle implementing a vehicle cut-in strategy.

As illustrated in FIG. 1, the autonomous vehicle 100, referred to as the "host vehicle", includes a vehicle system 105 for detecting potential vehicle cut-ins and ignoring certain cut-in situations as false-positives. Although illustrated as a sedan, the host vehicle 100 may include any passenger or commercial automobile such as a car, a truck, a sport utility vehicle, a crossover vehicle, a van, a minivan, a taxi, a bus, etc. Further, the vehicle may be configured to operate in an autonomous (e.g., driverless) mode, a partially autonomous mode, or a non-autonomous mode.

Figure 2:
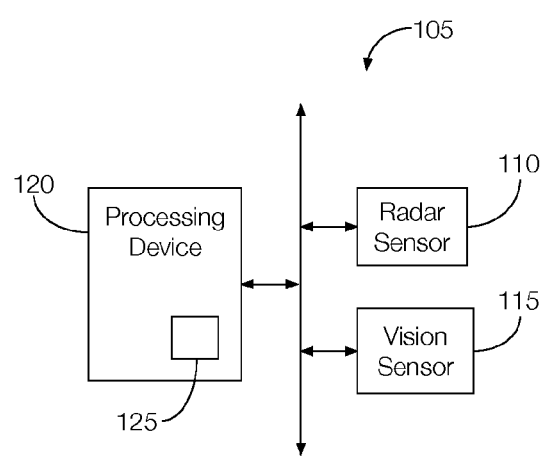
FIG. 2 is a block diagram of a vehicle system that may be incorporated into the vehicle of FIG. 1.

FIG. 2 is a block diagram of the vehicle system 105 that may be incorporated into the host vehicle 100. As shown, the vehicle system 105 includes a radar sensor 110, a vision sensor 115, and a processing device 120.

The radar sensor 110 may be configured to send a radio frequency (RF) signal, receive a reflected signal, and generate a radar signal in accordance with the reflected signal received. The radar signal may represent the presence of objects in the path of the host vehicle 100. Examples of such objects may include in-path vehicles and potential cut-in vehicles. Moreover, the radar sensor 110 may be configured to detect movement of objects. Thus, the radar signal may further represent the detected movement.

The vision sensor 115 may be configured to output a video signal representing objects in view of the vision sensor 115. In one possible implementation, the vision sensor 115 includes a camera. The video signal may be processed to show, e.g., in-path vehicles and potential cut-in vehicles. Moreover, movement of the in-path vehicles and potential cut-in vehicles may be represented by the video signal.

The processing device 120 may be programmed to implement the vehicle cut-in strategy in accordance with the radar signal and the video signal. For instance, the processing device 120 may be programmed to process the radar and video signals to determine the movement of a potential cut-in vehicle, compare the movement of the potential cut-in vehicle to one or more thresholds, and determine whether to ignore the potential cut-in vehicle or select the potential cut-in vehicle as an in-path vehicle based on whether the movement falls short of or exceeds the threshold.

Examples of thresholds may include a lateral speed threshold or a virtual boundary. The "lateral speed" may refer to how quickly the potential cut-in vehicle is moving laterally relative to the host vehicle 100. The "virtual boundary", discussed in greater detail below with reference to FIGS. 3A-3C, may refer to a space in front of the host vehicle 100 in "view" of both the radar sensor 110 and the vision sensor 115. If the lateral speed of the potential cut-in vehicle exceeds the speed threshold, and if a minimum percentage of the potential cut-in vehicle has crossed the virtual boundary, the processing device 120 may be programmed to select the potential cut-in vehicle as an in-path vehicle. Otherwise, the processing device 120 may ignore the potential cut-in vehicle.

In addition to detecting potential cut-in situations, the processing device 120 may be further programmed to determine whether the cut-in should be classified as a left-to-right cut-in or a right-to-left cut-in. A left-to-right cut-in may occur when the potential cut-in vehicle enters the virtual boundary from the left of the host vehicle 100. A right-to-left cut-in may occur when the potential cut-in vehicle enters the virtual boundary from the right of the host vehicle 100. Thus, the movement of the potential cut-in vehicle relative to the virtual boundary may be used to classify the potential cut-in direction. This cut-in direction can be further used to drop the cut-in target quickly in case of an incomplete cut-in maneuver.

To avoid potential false-negatives, the processing device 120 may be programmed to consecutively observe a minimum number of the same potential cut-in situation before determining whether to select the potential cut-in vehicle as an in-path vehicle or before electing to ignore a potential cut-in situation (i.e., clear a flag indicating a cut-in situation). For instance, the processing device 120 may be programmed to observe the same potential cut-in situation at least, e.g., three consecutive times before acting on the potential cut-in situation. The processing device 120 may include an internal counter 125 that may be incremented each time the potential cut-in situation is observed and reset each time a potential cut-in situation is not observed.

Figure 3A:
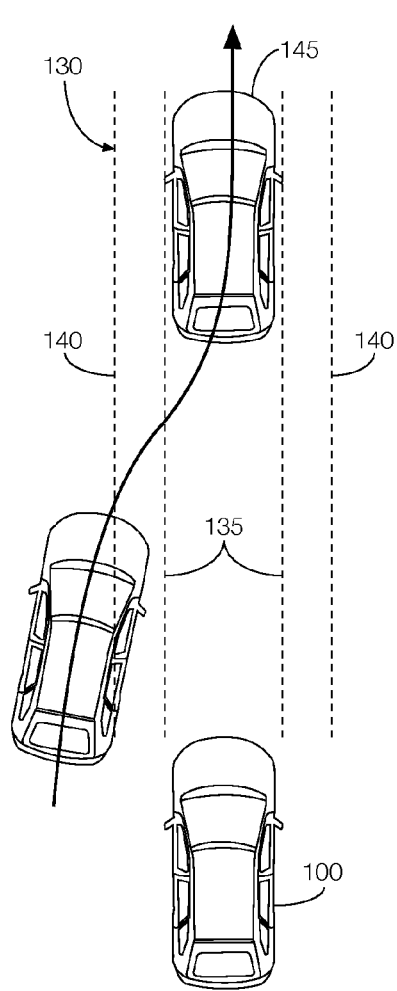
FIGS. 3A-3C are block diagrams illustrating cut-in situations.
Figure 3B:
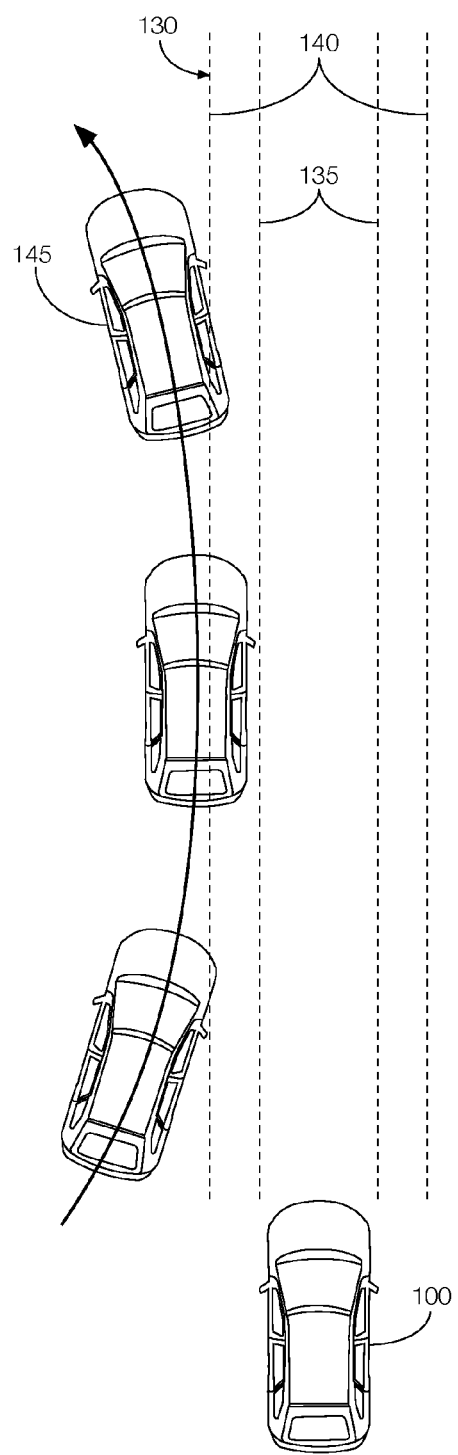
Figure 3C:
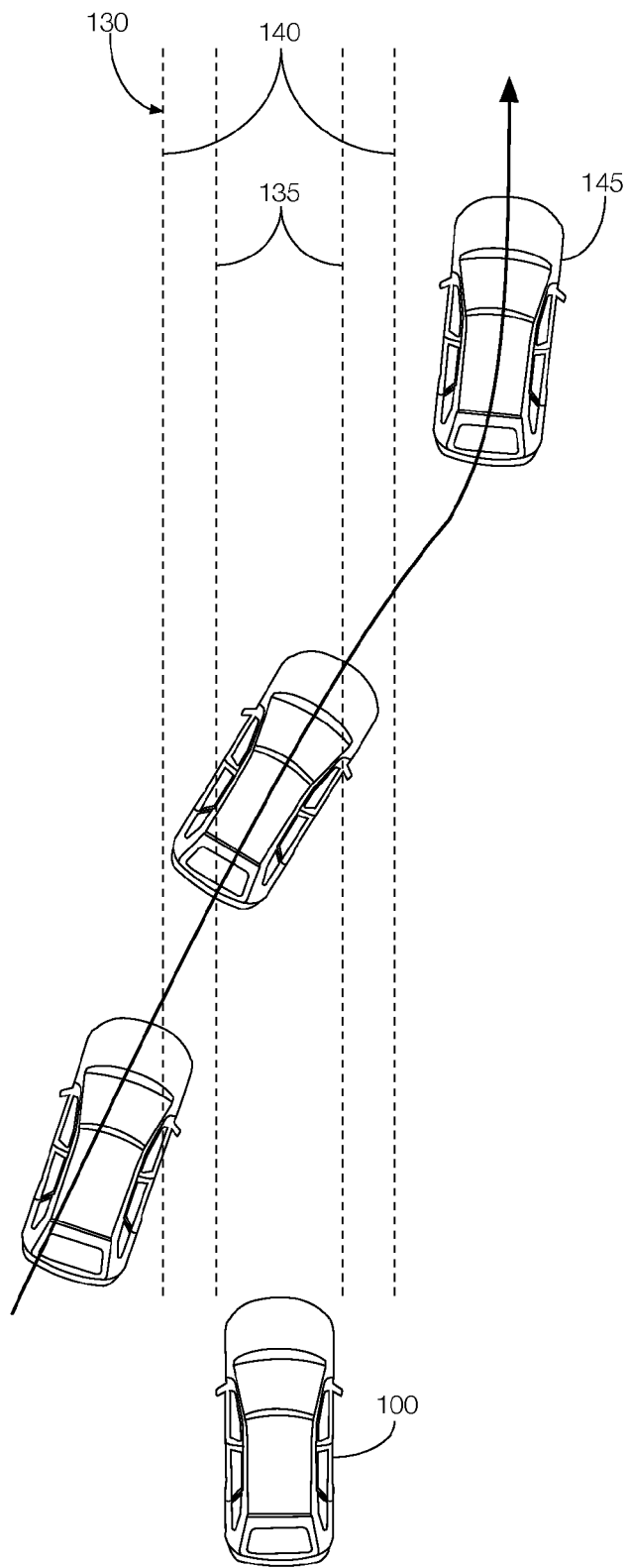

FIGS. 3A-3C illustrate different potential cut-in situations. In each of FIGS. 3A-3C, the virtual boundary 130 includes an inner boundary 135 and an outer boundary 140. Both the inner boundary 135 and outer boundary 140 each include two sides, referred to below as a "left side" and a "right side". It is not necessary for the two sides to be parallel. Rather, in some possible approaches, the two sides may be calibrated as a function of range or some other parameters.

In FIG. 3A, the potential cut-in vehicle 145 enters the virtual boundary 130 from the left and stays in the path of the host vehicle 100. In this situation, the vehicle system 105 will select the potential cut-in vehicle 145 as an in-path vehicle. The vehicle system 105 may first observe, via the radar and video signals, that the right edge and centroid of the potential cut-in vehicle 145 has crossed the left sides of the inner and outer boundaries. Accordingly, the vehicle system 105 may categorize the potential cut-in situation shown in FIG. 3A as a left-to-right cut-in. Moreover, the vehicle system 105 may select the potential cut-in vehicle 145 as an in-path vehicle because the potential cut-in vehicle 145 stays in the path of the host vehicle 100. The vehicle system 105 may determine that the potential cut-in vehicle 145 has stayed in the path of the host vehicle 100 after observing that the edges and centroid of the potential cut-in vehicle 145 do not cross the inner boundary 135 within a short time (e.g., several seconds) of the potential cut-in vehicle 145 entering the inner and outer boundaries. Although discussed in the context of a left-to-right cut-in situation, a similar approach may be applied in a potential right-to-left cut-in situation.

FIGS. 3B and 3C, however, present situations where the potential cut-in vehicle 145 will not be selected as an in-path vehicle. In FIG. 3B, the potential cut-in vehicle 145 begins to enter the virtual boundary 130. For instance, the right edge of the potential cut-in vehicle 145 may cross the left side of the outer boundary 140, the left side of the inner boundary 135, or both (i.e., the beginning of a left-to-right cut-in situation). The potential cut-in vehicle 145 may then veer away from the path of the host vehicle 100. Therefore, shortly after partially crossing the virtual boundary 130, the right edge of the potential cut-in vehicle 145 crosses the left side of the inner boundary 135, the outer boundary 140, or both. The centroid of the potential cut-in vehicle 145 never crosses the left side of the inner boundary 135. Therefore, the vehicle system 105 may determine that the potential cut-in vehicle 145 should not be considered an in-path vehicle. Although discussed in the context of a left-to-right cut-in situation, a similar approach may be applied in a potential right-to-left cut-in situation.

In FIG. 3C, the potential cut-in vehicle 145 enters the path of the host vehicle 100 but continues to a different lane that is not in the path of the host vehicle 100. As illustrated, the right edge and centroid of the cut-in vehicle crosses the left sides of the inner and outer boundaries, which the vehicle system 105 may interpret as a potential left-to-right cut-in situation. However, immediately (i.e., within a few seconds) after entering the path of the host vehicle 100, the right edge and centroid of the potential cut-in vehicle 145 cross the right side of the inner boundary 135 and outer boundary 140. In response to observing such movement, the vehicle system 105 may determine that the potential cut-in vehicle 145 is not an in-path vehicle. Although discussed in the context of a left-to-right cut-in situation, a similar approach may be applied in a potential right-to-left cut-in situation.

The example cut-in situations shown in FIGS. 3A-3C are just a few examples of potential cut-in vehicle 145 movement that the vehicle system 105 may observe. Other example situations may include an edge of the potential cut-in vehicle 145, but not the centroid, crossing one side of the virtual boundary 130 twice (into and out of the path of the host vehicle 100); and one edge and the centroid of the potential cut-in vehicle 145 crossing one side, but not the other edge (i.e., the potential cut-in vehicle 145 is partially occupying two lanes), for more than a brief period of time. The outcome of the situations presented in FIGS. 3A-3C, as well as other example situations, may depend on factors such as how much of the potential cut-in vehicle 145 is within the virtual boundary 130, including how much of the potential cut-in vehicle 145 is within the outer boundary 140, the inner boundary 135, or both; and how many consecutive times the potential cut-in vehicle 145 has been observed in the path of the host vehicle 100. For instance, if more than, e.g., 10% of the potential cut-in vehicle 145 is within the virtual boundary 130, and if more than 10% of the potential cut-in vehicle 145 has been observed within the virtual boundary 130 at least three consecutive times, the vehicle system 105 may determine that the potential cut-in vehicle 145 is an in-path vehicle.

Figure 4:
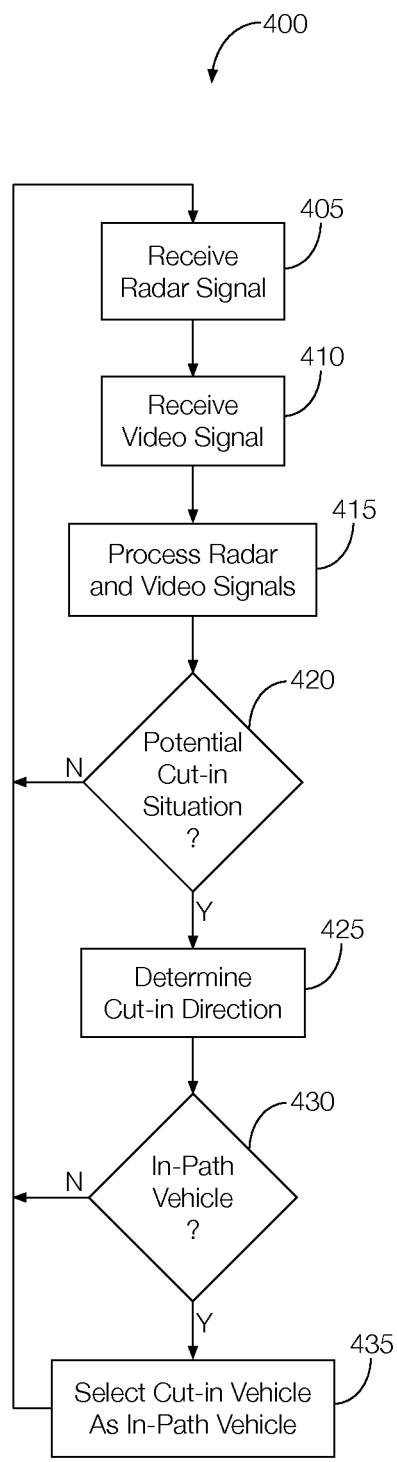

FIG. 4 is a flowchart of an example process 400 for detecting a potential vehicle cut-in. The process 400 may be implemented by the vehicle system 105 any time the host vehicle 100 is operating in an autonomous or partially autonomous mode.

At block 405, the processing device 120 may receive a radar signal. The radar signal may be generated and output by the radar sensor 110 and may represent movement of potential cut-in vehicle 145s and in-path vehicles relative to the host vehicle 100.

At block 410, the processing device 120 may receive a video signal. The video signal may be generated and output by the vision sensor 115. Like the radar signal, the video signal may represent the movement of other vehicles including potential cut-in vehicle 145s and in-path vehicles.

At block 415, the processing device 120 may process the radar and video signals. For instance, the processing device 120 may determine whether any of the detected movement relates to potential cut-in vehicle 145s, in-path vehicles, both, or neither.

At decision block 420, the processing device 120 may determine whether a potential cut-in vehicle 145 has been detected. In one possible approach, the processing device 120 may determine whether the potential cut-in vehicle 145 has been detected if both the radar signal and the visual signal confirm the presence of the potential cut-in vehicle 145. That is, the processing device 120 may compare the location of the potential cut-in vehicle 145 to the virtual boundary 130. As discussed above, the virtual boundary 130 may include the inner boundary 135, the outer boundary 140, or both. The presence of the potential cut-in vehicle 145 may be determined by the location of the potential cut-in vehicle 145 to the virtual boundary 130, including how much, if any, of the potential cut-in vehicle 145 is within the virtual boundary 130. If the potential cut-in vehicle 145 has been detected, the process 400 may continue at block 425. Otherwise, the process 400 may continue at block 405.

At block 425, the processing device 120 may determine the direction of the potential cut-in. For instance, the processing device 120 may classify the potential cut-in as a "left-to-right" cut-in or a "right-to-left" cut-in. A left-to-right cut-in may be detected when the right edge of the potential cut-in vehicle 145 crosses a left side of the virtual boundary 130, and a right-to-left cut-in may be detected when the left edge of the potential cut-in vehicle 145 crosses a right side of the virtual boundary 130.

At decision block 430, the processing device 120 may determine whether to select the potential cut-in vehicle 145 as an in-path vehicle. In one possible implementation, the processing device 120 may only select the potential cut-in vehicle 145 as an in-path vehicle if the potential cut-in vehicle 145 is consecutively observed cutting in, relative to the host vehicle 100, a predetermined number of times. If so, the process 400 may continue at block 435. Otherwise, the process 400 may ignore the potential cut-in vehicle 145, and the process 400 may return to block 405.

At block 435, the processing device 120 may select the potential cut-in vehicle 145 as an in-path vehicle and autonomously control the host vehicle 100 accordingly. The process 400 may return to block 405 after block 435 and may continue to execute until the host vehicle 100 is turned off or is otherwise no longer operating in an autonomous or partially autonomous mode.

Figure 5:
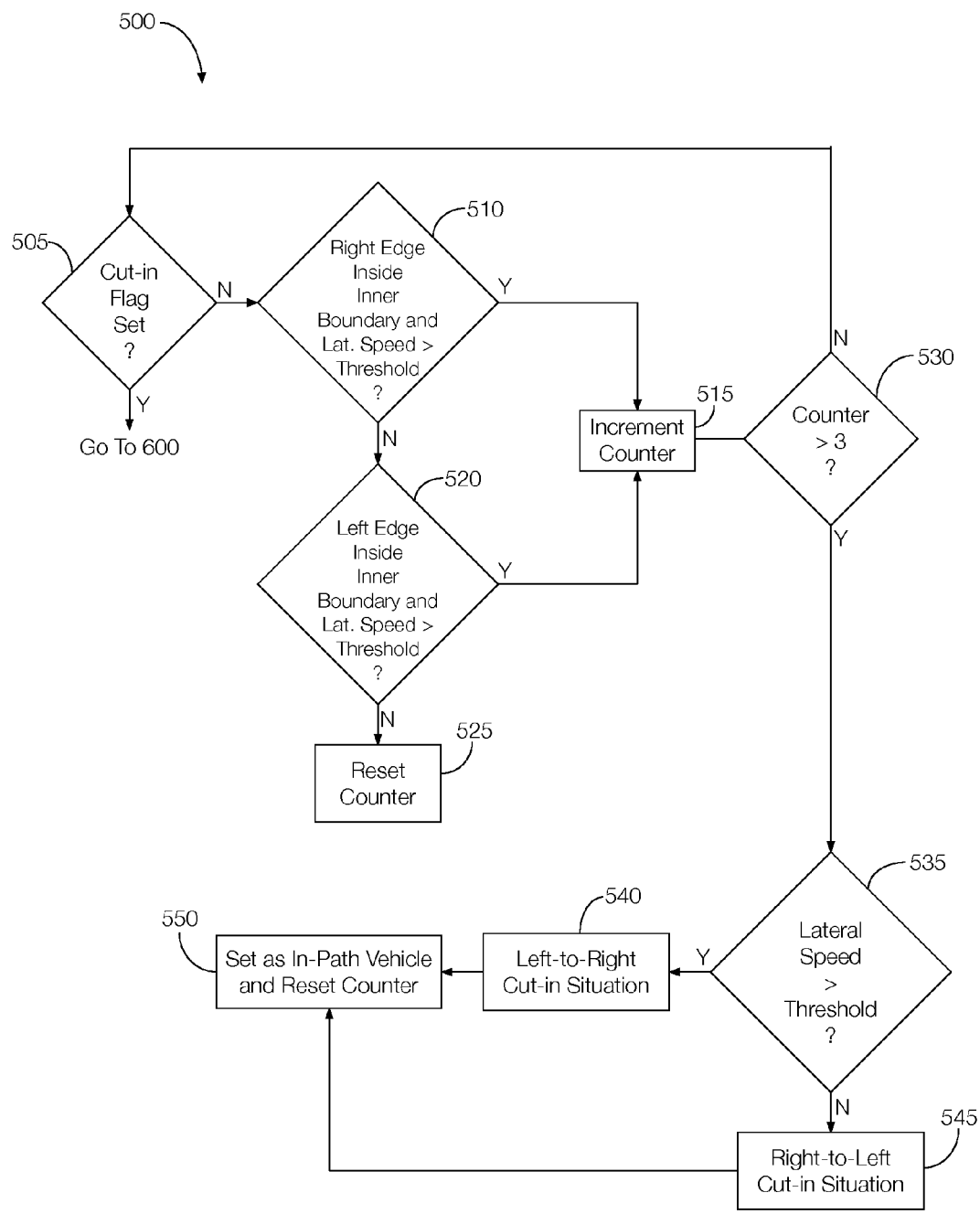
FIG. 5 is a flowchart of another possible implementation of the process of FIG. 4.

FIG. 5 is a flowchart of another possible implementation of certain parts of the process 400 described above with reference to FIG. 4. Like the process 400, the process 500 shown in FIG. 5 may be implemented by the vehicle system 105 any time the host vehicle 100 is operating in an autonomous or partially autonomous mode. Moreover, the process 500 may be initiated after a potential cut-in has been detected.

At decision block 505, the processing device 120 may determine whether a cut-in flag has been set. The cut-in flag may indicate that a cut-in vehicle has already been detected. If the cut-in flag has been set, the process 500 may end and the process 600, discussed below with reference to FIG. 6, may begin. If the cut-in flag has not been set, the process 500 may continue at decision block 510.

At decision block 510, the processing device 120 may determine whether the potential cut-in vehicle 145 is a left-to-right cut-in. A left-to-right cut-in may be detected when the right edge of the potential cut-in vehicle 145 crosses a left side of the virtual boundary 130. If the virtual boundary 130 includes both an inner and outer boundary 140, the left-to-right cut-in may be observed when the right edge of the vehicle crosses the left side of the inner boundary 135. The processing device 120 may further consider the lateral speed of the potential cut-in vehicle 145 when determining whether the potential cut-in is a left-to-right cut-in. If the potential cut-in is a left-to-right cut-in, the process 500 may continue at block 515. Otherwise, the process 500 may continue at block 520.

At block 515, the processing device 120 may increment a counter 125. The counter 125 may be used to count the number of consecutive times a cut-in situation has been observed.

At decision block 520, the processing device 120 may determine whether the potential cut-in situation is a right-to-left cut-in. a right-to-left cut-in may be detected when the left edge of the potential cut-in vehicle 145 crosses a right side of the virtual boundary 130. If the virtual boundary 130 includes both an inner and outer boundary 140, the right-to-left cut-in may be observed when the left edge of the vehicle crosses the right side of the inner boundary 135. The processing device 120 may further consider the lateral speed of the potential cut-in vehicle 145 when determining whether the potential cut-in is a right-to-left cut-in. If the potential cut-in is a right-to-left cut-in, the process 500 may continue at block 515. Otherwise, the process 500 may continue at block 525.

At block 525, the processing device 120 may reset the counter 125. This way, only consecutive observations of a particular type of cut-in situation will increment the counter 125, and the counter 125 will be reset every time a non-cut-in situation is observed.

At decision block 530, the processing device 120 may determine whether the count exceeds a predetermined threshold. By comparing the count to the predetermined threshold, the processing device 120 may only consider potential cut-in vehicle 145s that consecutively exhibit the potential cut-in situation the predetermined number of times as the in-path vehicle. As shown in FIG. 5, the predetermined threshold is three. Different numbers may be used, however.

At decision block 535, the processing device 120 may compare the lateral speed of the potential cut-in vehicle 145 to a predetermined threshold relative to the host vehicle 100. The predetermined threshold may be zero so that, e.g., positive lateral speeds may indicate a, e.g., left-to-right cut-in and negative lateral speeds may indicate a, e.g., right-to-left cut-in. If the lateral speed exceeds the predetermined threshold, the process 500 may continue at block 540. Otherwise, the process 500 may continue at block 545.

At block 540, the processing device 120 may classify the cut-in situation as a left-to-right cut-in situation. The process 500 may continue at block 550 after block 540.

At block 545, the processing device 120 may classify the cut-in situation as a left-to-right cut-in situation. The process 500 may continue at block 550 after block 545.

At block 550, the processing device 120 may select the potential cut-in vehicle 145 as the in-path vehicle and autonomously control the host vehicle 100 accordingly. One way to select the potential cut-in vehicle 145 as the in-path vehicle is to set a flag indicating the type of cut-in situation. Moreover, the processing device 120 may reset the counter 125.

Figure 6:
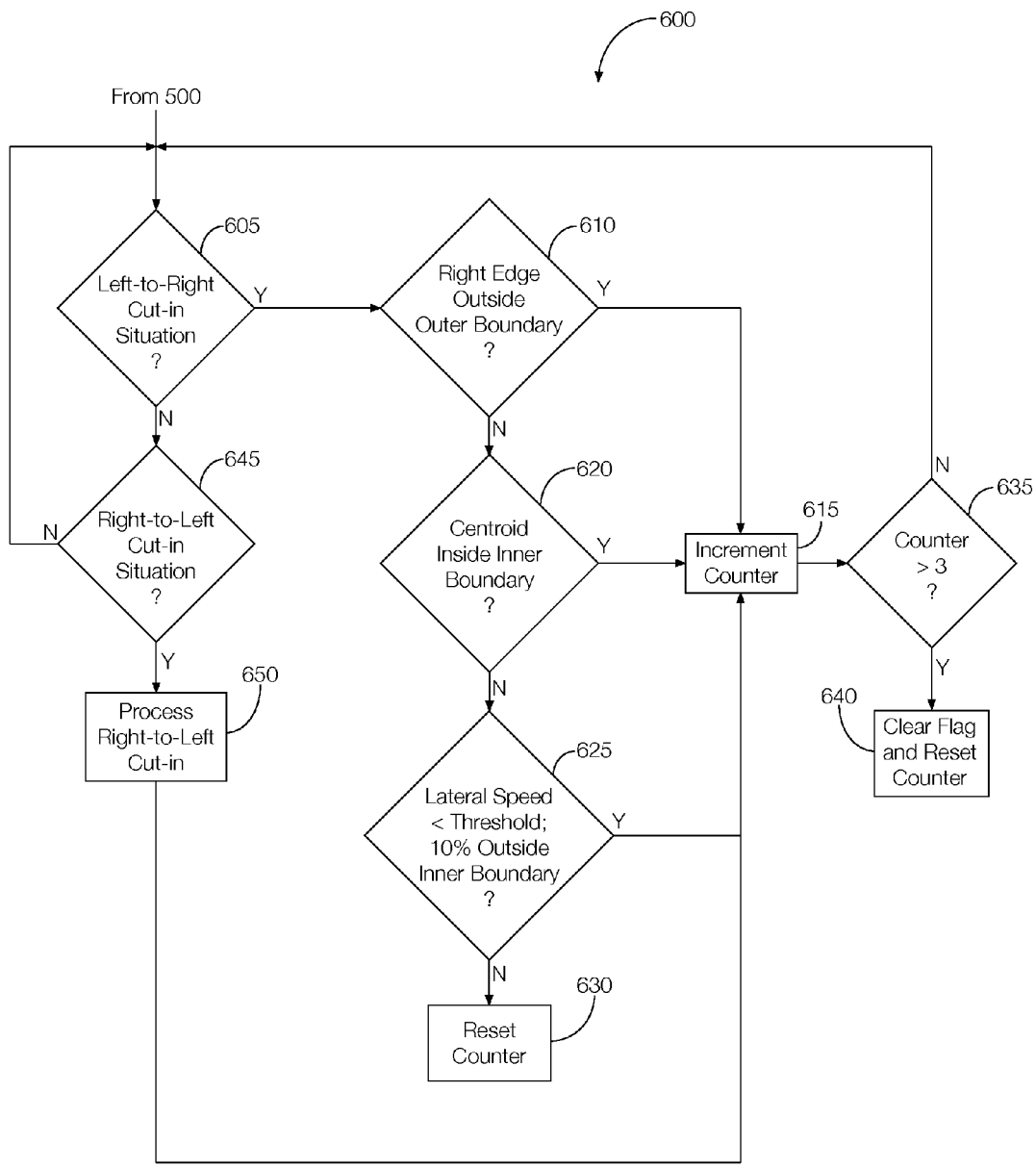
FIG. 6 is a flowchart of an example process for ignoring false-positive cut-in situations.

FIG. 6 is a flowchart of an example process 600 for ignoring false-positive cut-in situations. The process 600 may be executed if, e.g., a cut-in flag has already been set. Therefore, process 600 may begin after block 505 of the process 500 discussed above with reference to FIG. 5.

At decision block 605, the processing device 120 may determine whether the cut-in was determined to be a left-to-right cut-in situation. If so, the process 600 may continue at block 610. Otherwise, the process 600 may continue at block 645.

At decision block 610, the processing device 120 may determine whether the right edge of the potential cut-in vehicle 145 is outside the virtual boundary 130, and in particular, the outer boundary 140. A potential cut-in vehicle 145 with the right edge outside the outer boundary 140 suggests that the potential cut-in vehicle 145 does not intend to perform a cut-in maneuver. If the right edge is outside the outer boundary 140, the process 600 may continue at block 615. If the right edge of the potential cut-in vehicle 145 is within the outer boundary 140, the process 600 may continue at block 620.

At block 615, the processing device 120 may increment a counter 125. The counter 125 may be used to count the number of consecutive times a non-cut-in situation has been observed.

At decision block 620, the processing device 120 may determine whether the centroid of the potential cut-in vehicle 145 is within the inner boundary 135. The centroid of the potential cut-in vehicle 145 staying within the inner boundary 135 suggests that the potential cut-in vehicle 145 is already in the path of the host vehicle 100 and, therefore, does not intend to perform a cut-in maneuver. If the centroid is within the inner boundary 135, the process 600 may continue at block 615 so that the counter 125 may be incremented. Otherwise, the process 600 may continue at block 625.

At decision block 625, the processing device 120 may determine whether the lateral speed of the potential cut-in vehicle 145 suggests that the potential cut-in vehicle 145 is moving laterally (e.g., to the right for a left-to-right cut-in situation). The processing device 120 may further determine whether at least, e.g., 10% of the potential cut-in vehicle 145 is outside the inner boundary 135. If the potential cut-in vehicle 145 is not moving laterally, and if not more than, e.g., 10% of the potential cut-in vehicle 145 is within the inner boundary 135, the process 600 may continue at block 615. Otherwise, the process 600 may continue to block 630.

At block 630, the processing device 120 may reset the counter 125 to zero. This way, only consecutive observations of non-cut-in situations will increment the counter 125, and the counter 125 will be reset every time a potential cut-in situation is observed.

At decision block 635, the processing device 120 may determine whether to clear the cut-in flag. In one possible implementation, the processing device 120 may only clear the cut-in flag if the potential cut-in vehicle 145 is consecutively observed performing non-cut-in maneuvers, relative to the host vehicle 100, a predetermined number of times (e.g., three times in the example of block 635). If the predetermined number of non-cut-in maneuvers is consecutively observed, the process 600 may continue at block 640. Otherwise, the process 600 may continue at block 605.

At block 640, the processing device 120 may clear the cut-in flag and autonomously control the host vehicle 100 accordingly. The process 600 may end after block 640, at least until a cut-in flag is subsequently set.

At decision block 645, the processing device 120 may determine whether the cut-in was determined to be a right-to-left cut-in situation. If so, the process 600 may continue at block 650. Otherwise, the process 600 may continue at block 605 to await further potential cut-in situations.

At block 650, the processing device 120 may execute blocks similar to blocks 610, 620, 625, and 630 but adjusted for a right-to-left cut-in. For instance, instead of comparing the right edge of the to the outer boundary 140, which occurs at block 610, the processing device 120 may instead compare the left edge to the outer boundary 140, which may be more relevant for a right-to-left cut-in. Moreover, when the processing device 120 compares the lateral speed, which also occurs at block 625, the processing device 120 may instead determine whether the lateral speed suggests a right-to-left cut-in. The process 600 may continue at block 615 after the right-to-left cut-in has been detected.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
    a first sensor configured to output a first signal;
    a second sensor configured to output a second signal, wherein the first signal and the second signal represent movement of a potential cut-in vehicle; and
    a processing device programmed to compare the movement of the potential cut-in vehicle to at least one threshold and select the potential cut-in vehicle as an in-path vehicle if the movement exceeds the at least one threshold,
    wherein the threshold includes a virtual boundary, and wherein the processing device is programmed to compare the movement of the potential cut-in vehicle to the virtual boundary by determining whether a centroid of the potential cut-in vehicle has crossed the virtual boundary.

2. The vehicle system of claim 1, wherein the at least one threshold includes a lateral speed threshold.

3. The vehicle system of claim 1, wherein comparing the movement to the virtual boundary includes determining whether an edge of the potential cut-in vehicle has crossed the virtual boundary.

4. The vehicle system of claim 1, wherein the virtual boundary includes an inner boundary and an outer boundary, wherein the inner boundary is disposed within the outer boundary.

5. The vehicle system of claim 4, wherein comparing the movement to the virtual boundary includes determining whether an edge of the potential cut-in vehicle has crossed the inner boundary.

6. The vehicle system of claim 4, wherein comparing the movement to the virtual boundary includes determining whether the centroid of the potential cut-in vehicle has crossed the inner boundary.

7. The vehicle system of claim 4, wherein the inner boundary includes a first inner boundary side and a second inner boundary side and the outer boundary includes a first outer boundary side and a second outer boundary side, wherein the first and second inner boundary sides are disposed between the first and second outer boundary sides.

8. The vehicle system of claim 7, wherein comparing the movement to the virtual boundary includes determining whether an edge of the potential cut-in vehicle each of the first outer boundary side, the first inner boundary side, the second inner boundary side, and the second outer boundary side.

9. The vehicle system of claim 7, wherein comparing the movement to the virtual boundary includes determining whether an edge of the potential cut-in vehicle crossed the first outer boundary side multiple times.

10. The vehicle system of claim 7, wherein comparing the movement to the virtual boundary includes determining whether a centroid of the potential cut-in vehicle is disposed between the first and second inner boundary sides.

11. The vehicle system of claim 1, wherein the processing device is programmed to determine a cut-in direction.

12. The vehicle system of claim 1, wherein the first sensor includes a radar sensor and the second sensor includes a vision sensor.

13. A method for an autonomous vehicle, the method comprising:
    receiving a first signal representing movement of a potential cut-in vehicle;
    receiving a second signal representing movement of the potential cut-in vehicle;
    comparing the movement to at least one threshold, the threshold including a virtual boundary and wherein comparing the movement includes determining whether a centroid of the potential cut-in vehicle has crossed the virtual boundary;
    selecting the potential cut-in vehicle as an in-path vehicle if the movement exceeds the at least one threshold; and
    controlling operation of the autonomous vehicle according to the in-path vehicle.

14. The method of claim 13, further comprising generating the virtual boundary, and wherein comparing the movement to the threshold includes comparing the movement to the virtual boundary.

15. The method of claim 14, wherein comparing the movement to the virtual boundary includes determining whether an edge of the potential cut-in vehicle has crossed the virtual boundary.

16. The method of claim 14, wherein the virtual boundary includes an inner boundary and an outer boundary, wherein the inner boundary is disposed within the outer boundary.

17. The method of claim 16, wherein comparing the movement to the virtual boundary includes determining whether both an edge of the potential cut-in vehicle and the centroid of the potential cut-in vehicle has crossed at least one of the inner boundary and the outer boundary.

* * * * *